United States Patent
Feldpusch

(10) Patent No.: US 10,475,091 B2
(45) Date of Patent: Nov. 12, 2019

(54) DYNAMIC PROVISIONING SYSTEM FOR COMMUNICATION NETWORKS

(71) Applicant: Level 3 Communications, LLC, Broomfield, CO (US)

(72) Inventor: Michael E. Feldpusch, Westminster, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 367 days.

(21) Appl. No.: 15/418,157

(22) Filed: Jan. 27, 2017

(65) Prior Publication Data

US 2017/0236105 A1    Aug. 17, 2017

Related U.S. Application Data

(60) Provisional application No. 62/294,188, filed on Feb. 11, 2016.

(51) Int. Cl.
*G06Q 30/02* (2012.01)

(52) U.S. Cl.
CPC .............................. *G06Q 30/0283* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | |
|---|---|---|---|
| 8,341,397 B2 * | 12/2012 | Leedom, Jr. ......... | H04L 63/068 713/156 |
| 8,589,524 B1 | 11/2013 | Sella et al. | |
| 9,055,067 B1 * | 6/2015 | Ward, Jr. ............... | H04L 67/10 |
| 9,063,763 B2 * | 6/2015 | Astete ................. | G06F 9/45533 |
| 9,088,509 B1 | 7/2015 | Sella | |
| 9,240,025 B1 * | 1/2016 | Ward, Jr. ........... | G06Q 30/0283 |
| 9,497,040 B1 * | 11/2016 | Miller ................. | H04L 12/4641 |
| 9,853,869 B1 * | 12/2017 | Shaham .................. | H04L 67/10 |
| 2001/0007979 A1 * | 7/2001 | Teshima ................ | G06Q 10/08 705/23 |
| 2005/0065855 A1 * | 3/2005 | Geller .................... | G06Q 20/12 705/26.1 |
| 2006/0013147 A1 | 1/2006 | Terpstra et al. | |
| 2009/0138925 A1 * | 5/2009 | Headings ............... | H04N 7/165 725/109 |

(Continued)

OTHER PUBLICATIONS

"Introducing Development Features for Virtualized Network Services", Rossen et al., IEEE Communications Magazine, Aug. 2018 , (Year: 2018).*

(Continued)

*Primary Examiner* — Frantzy Poinvil

(57) ABSTRACT

According to one embodiment of the present disclosure, a virtualized communication device dynamic provisioning system includes a computer-based set of instructions that are executed to generate a user interface for receiving selection of one or more virtualized communication devices. The instructions may then receive provisioning information associated with the selected virtualized communication devices from the user interface, and provision the virtualized communication devices in accordance with the received provisioning information to prepare and equip the virtualized communication devices according to the financial transaction.

17 Claims, 6 Drawing Sheets

(56) References Cited

U.S. PATENT DOCUMENTS

2009/0276771 A1* 11/2009 Nickolov .............. G06F 9/4856
  717/177
2011/0143782 A1   6/2011 Dowlatkhah
2015/0263885 A1   9/2015 Kasturi
2017/0109245 A1*  4/2017 McAlister ........... G06F 11/1435
2017/0293500 A1* 10/2017 Molina .............. G06F 9/45558

OTHER PUBLICATIONS

"Computers management framework for virtual data center embedding based on software defined networking", Jianqiang Ma, School of Public Adninstration, Beihang University, Beijing 100191, China. (Year: 2016).*

International Search Report dated Apr. 10, 2017, Int'l. Appl. No. PCT/US17/015372, Int'l Filing Date Jan. 27, 2017.

Written Opinion of the International Searching Authority dated Apr. 10, 2017, Int'l. Appl. No. PCT/US17/015372, Int'l Filing Date Jan. 27, 2017, 8 pgs.

International Preliminary Report on Patentability, dated Aug. 14, 2018, Int'l Appl. No. PCT/US17/015372, Int'l Filing Date Jan. 27, 10 pgs.

* cited by examiner

FIG. 3C

VNF SELECTION SCREEN — 332

Please select a router from among the list:

| Model | Location | Performance Rating | Cost | Cart? |
|---|---|---|---|---|
| ACME 501c10 | Dallas, TX | 100 GB/Sec. | $4.99 | O |
| ACME 1100d | Dallas, TX | 500 GB/Sec. | $10.99 | O |
| ACME 1102a | Dallas, TX | 500 GB/Sec. | $12.99 | ● |
| ACME 1102e | Denver, CO | 750 GB/Sec. | $22.95 | O |
| Bell Works 102a | Denver, CO | 200 GB/Sec. | $5.25 | O |
| Bell Works 302 | Denver, CO | 500 GB/Sec. | $11.97 | O |

334a · 334b · 334c · 334d · 334e

[Cancel] [Continue]

TRANSACTION CONSUMMATION SCREEN — 352

Review items in your cart and check out when ready:

| | |
|---|---|
| ACME 1102A Router | $12.99/month |
| ABC Corp 1532b Load Balancer | $3.49/month |
| ACME 6634 Firewall | $4.44/month |

Total: $20.92

[Continue Shopping] [Proceed to Checkout]

350

DYNAMIC PROVISIONING SYSTEM FOR COMMUNICATION NETWORKS

RELATED APPLICATIONS

This application is related to and claims priority under 35 U.S.C. § 119(e) to U.S. patent application Ser. No. 62/294,188, filed Feb. 11, 2016, entitled "DYNAMIC PROVISIONING SYSTEM FOR COMMUNICATION NETWORKS," the entire contents of which is incorporated herein by reference for all purposes.

TECHNICAL FIELD

Aspects of the present disclosure relate to communication networks and, in particular, to a dynamic provisioning system for communication networks.

BACKGROUND

Network Functions Virtualization (NFV) refers to a technology in which a virtualization technology is used to design a network structure with industry standard servers, switches, and storage that are provided as virtualized communication devices. That is, the NFV technology implements network functions as virtualized software objects that can be run in existing industry standard servers and hardware. NFV technology may also be supported by a cloud computing technology and in some cases, may also utilize various industry-standard high volume server technologies.

Using NFV, networks may be implemented that scale easily due the inherent extensibility provided by virtualization. Nevertheless, conventional NFV architectures are generally implemented as enterprise level structures due to their relatively high level of complexity. Therefore, smaller organizations that may not have the resources or capital to warrant use of such enterprise level devices and may be limited in their ability to make use of this innovative architecture.

It is with these observations in mind, among others, that various aspects of the present disclosure were conceived and developed.

SUMMARY

According to one embodiment of the present disclosure, a virtualized communication device dynamic provisioning system includes a computer-based set of instructions that are executed to generate a user interface for receiving selection of one or more virtualized communication devices. The instructions may then receive provisioning information associated with the selected virtualized communication devices from the user interface, and provision the virtualized communication devices in accordance with the received provisioning information to prepare and equip the virtualized communication devices according to the financial transaction.

BRIEF DESCRIPTION OF THE DRAWINGS

The foregoing and other objects, features and advantages of the disclosure will be apparent from the following description of particular embodiments of the disclosure, as illustrated in the accompanying drawings. The drawings are not necessarily to scale and often may provide simplified views of various features with emphasis instead being placed upon illustrating the principles of the disclosure.

FIGS. 3A through 3D illustrate example screenshots that may be displayed by the network function leasing application for leasing VNFs on the user interface of a customer computing device according to one embodiment of the present disclosure.

DETAILED DESCRIPTION

Figure 1:
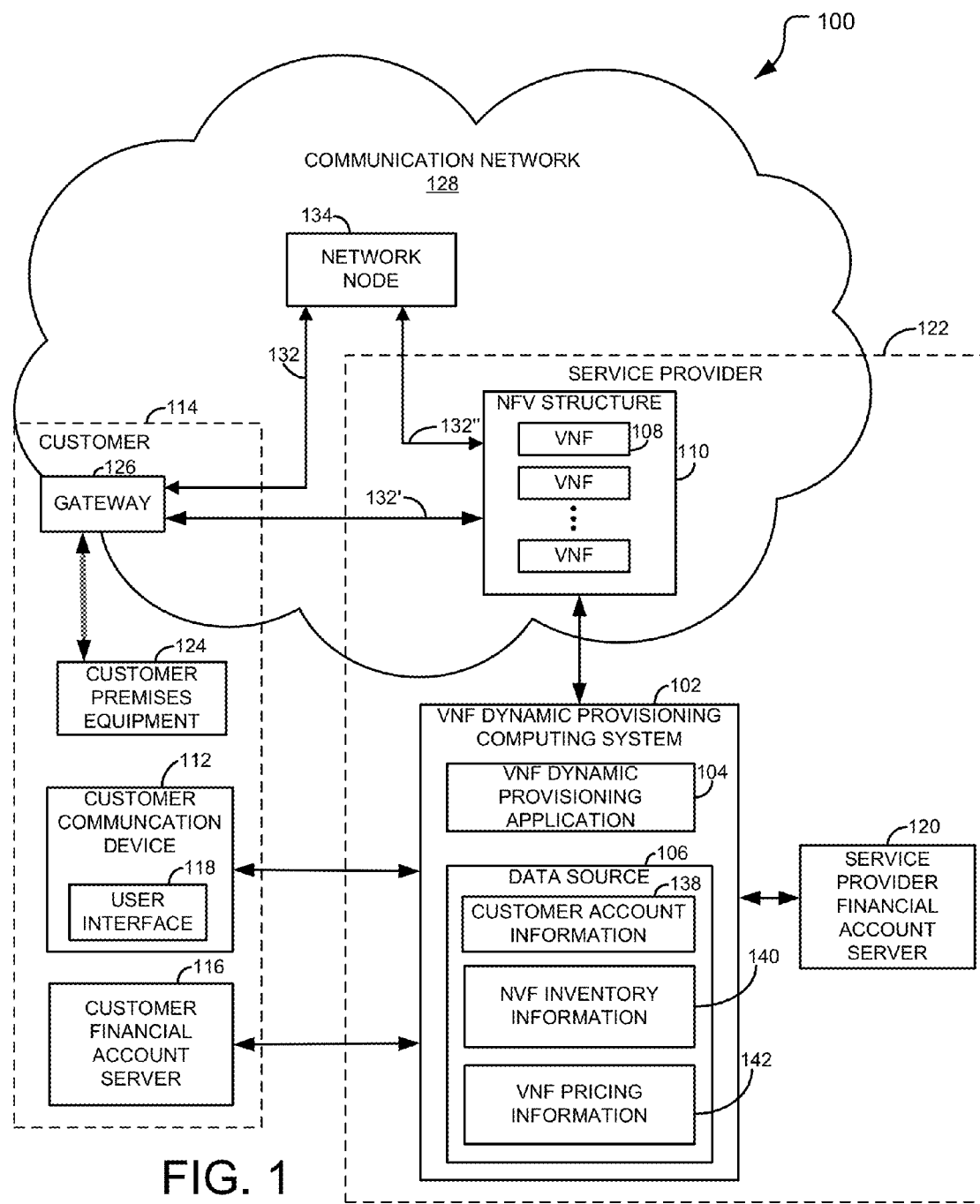
FIG. 1 depicts an example virtualized network function (VNF) dynamic provisioning system according to one embodiment of the present disclosure.

Aspects of a dynamic provisioning system and method described herein provides a technique for leasing communication devices to customers on an on-demand basis using a user interface, such as an online website, that interacts with a customer to receive selection of one or more communication devices from among multiple communication devices and provisions those devices for use by the customer. When selection of the communication devices has been received, the system facilitates a financial transaction with the customer to pay for the communication services provided by the communication devices, and communicates with one or more network structures to facilitate provisioning of the selected communication devices for use by the customer. Embodiments of the present disclosure may be particularly well suited for virtualized functions, such as virtualized network functions (VNFs) implemented in a virtualized environment, such as a network function virtualization (NFV) structure that can be provisioned and de-provisioned in a relatively easy manner for many customers on an on-demand basis.

Communication devices typically used in modern communication networks may include routers, switches, hubs, firewalls, security appliances, load balancers, and encryption appliances, just to name a few. Each of these communication devices serves a particular purpose in support of communication services provided over the communication networks. Moreover, a structured combination of these communication devices may be provisioned to provide various communication services to customers of the communication networks. These communication services, nevertheless, may change on a frequent basis due to many factors, such as changes in needed throughput capacity (e.g., bandwidth), increase or decrease in demand, and the like. As such, development of communication networks that are adaptable and extensible to ever changing needs of the customer has become an important factor to the success of these networks.

NFV is one particular type of architecture that has been developed to meet these needs. In general, NFV is a network architecture that utilizes virtualization to provide communication devices that operate in a virtualized computing environment. Generally speaking, a NFV is provided by one or more physical hosts (e.g., a stand-alone computing device, multiple blades implemented in a blade array, etc.) that may each execute one or more VNFs. Each VNF typically includes an operating system and is implemented in a manner to generally emulate the operations of a stand-alone computing device, such as a physical host. VNFs may provide certain advantages over that of their physical host counterparts in that their operation may be abstracted from the underlying physical structure that supports their operation.

Nevertheless, communication devices implemented as VNFs in a NFV structure are often large, complex structures that are relatively costly to implement and are thus are often only used by large corporations having relatively large needs to justify the costs and maintenance of the NFV structure. That is, smaller organizations, which may not require the use of a fully implemented NFV structure and do not possess sufficient financial resources to warrant use of NFV structures may be limited in their access to this new and promising technology.

FIG. 1 depicts an example VNF dynamic provisioning system 100 according to one embodiment of the present disclosure. The VNF dynamic provisioning system 100 includes a NFV provisioning computing system 102 that stores a NFV provisioning application 104 and a data source 106. As will be described in detail herein below, the application 104 receives requests to lease one or more VNFs 108 of a NFV structure 110 from a user interface 118 executed by a customer computing device 112 of a customer 114, and activates the requested VNFs 108 for use by the customer 114. The application 104 may also communicate with a customer financial account server 116 associated with the customer to conduct a financial transaction for use of the VNFs 108.

Although the present example describes VNFs 108 that can be leased to customer on an on-demand basis, it is contemplated that any suitable type of communication device may be leased using the teachings of the present disclosure. For example, the VNF dynamic provisioning system 100 may be used to lease one or more hardware-based communication devices in which these hardware-based communication devices may be remotely provisioned, by the system 100, to prepare and equip the communication devices to be used by the customer on a lease-by-lease basis. Nevertheless, communication devices embodied as VNFs may provide certain advantages, such as leveraging the enhanced capabilities of VNFs by entities, such as small organizations, that would otherwise be limited from their use due to their relatively complex nature and high cost layout. Additionally, communication devices implemented as VNFs in a NFV structure are logical objects that are easily provisioned and deleted, thus forming a system that can be conducive to being leased on an on-demand basis. For example, communication devices, such as VNFs 108 may be leased for use by the customer over a specified time frame, such as the current date to 6 months from now, next year starting on January 1st, the first three weeks of March, and the like.

Within this disclosure, the term 'lease' means providing a product or service (e.g., a virtualized communication device) to a customer for a specified period of time, and may in some cases, involve payment for use of those products or services from the customer to the provider of those products or services. To consummate the lease, the application 104 may facilitate a financial transaction between a customer financial account of the customer 114 by communicating with a customer financial account server 116 to provide payment for the leased VNFs 108. Once payment is received, the application 104 may communicate with a service provider financial account server 120 to transfer the received payment to a service provider financial account of a service provider 122 who manages the operation of the NFV structure 110. The service provider financial account server 120 generally refers to an entity that stores information associated with a financial account maintained for the service provider that maintains the NFV structure 110, while the customer financial account server 116 generally refers to another entity associated with a financial account of the customer. The service provider financial account server 120 and the customer financial account server 116 have one or more processors and executable instructions stored in volatile and/or non-volatile memory for performing the actions and/or steps described herein.

The customer 114 may be any entity, such as an individual, or an organization (e.g., non-profit business, for-profit business, university, governmental organization, etc.) that may use the VNFs 108 provided by the system 100. The customer 114 may manage a customer premises equipment (CPE) 124, a gateway 126, and the customer computing device 112. The CPE 124 may serve as an endpoint that originates and terminates communication traffic through a communication network 128. For example, the CPE may be a private branch exchange (PBX) that is coupled to the gateway 126 via a trunk or other communication link. The gateway 126 serves as an interface between the CPE 124 and the communication network 128, and may perform various functions, such as link session negotiation, protocol translation, fault isolation, impedance matching, and the like.

In a particular example implementation, the customer 114 having an established communication link 132 that extends at least from the CPE 124 to a network node 134, desires to provide enhanced security for that link 132 by leasing certain VNFs 108 from the service provider 122. Therefore, the customer 114 may lease certain VNFs 108, such as a firewall and an encryption appliance, provision those NVFs 108 to establish a new link 132' between the gateway 126 and NFV structure 110, and another link 132" extending between the NFV structure 110 and the network node 134 such that the original link 132 is replaced by the new links 132' and 132". Thus, the leased VNFs 108 may provide enhanced security and malware protection by using VNFs 108 that can be modified and/or replaced on an ad-hoc basis to meet the needs of the customer 114 in an extensible manner.

The VNF provisioning computing system 104 may include any type that manages the operation of the application 104, and communicates with the NFV structure 110, customer computing device 112, customer financial account server 116, and service provider financial account server 120 for leasing VNFs 108 to customers on a lease-by-lease basis. In one embodiment, the VNF provisioning computing system 104 functions according to an operational support system (OSS) that manages various operations of the VNFs 108 in the NFV structure 110 as well as other communication devices in the communication network 128. Examples of other operations that may be performed by the VNF provisioning computing system 104 may include network configuration of each or a combination of communication devices (VNFs 108, network node 134, etc.), network inventory, network configuration, and fault management.

The NFV structure 110 may be implemented in any suitable data communication network 128. For example, the communication network 128 may be an Internet Protocol (IP) based communication network, such as a 'tier 1' communication network that provides varying types of communication services (e.g., voice, data, and video communication services, etc.). The communication network 128 provides multiple communication services for users using various communication devices (e.g., VNFs 108, gateways 126, network nodes 134, etc.) that convey or otherwise relay data traffic from one communication device to another communication device to provide various types of communication services. Communication services that may be provided include, for example, voice communication services, data communication services (e.g., Internet, e-mail messaging, etc.), and video communication services (e.g., multimedia messaging services (MMS), digital video broadcast services (DVB), video streaming, etc.).

Each communication device may have various purposes and responsibilities in the communication network 128. For example, the communication devices may include packet switches or packet routers that route communication services between two or more communication devices. Other types of communication devices may include gateway devices each having a first interface that communicates according to a first protocol, and a second interface that communicates according to a second protocol, such as one that interfaces a data communication network (e.g., the Internet) with a public switched telephone network (PSTN). A typical gateway may have many interfaces communicating over the same and/or different protocols. The gateway 126 may be, for example, an ingress network element and/or egress network element that that receives packets from or transmits packet to, respectively, a customer communication device.

The communication devices may communicate with one another in any suitable manner, such as using wireless, wired, and/or optical communications. In one embodiment, the communication devices communicate with one another using a communication network, such as the Internet, an intranet, or another wired and/or wireless communication network. In another embodiment, the communication devices communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the communication devices may communicate with one another without the use of a separate and a distinct network. Additionally, other embodiments contemplate that the modules employed by the communication devices.

The data source 106 stores customer account information 138, VNF inventory information 140, VNF inventory information 140, and VNF pricing information 142. The customer account information 138 includes information associated with each customer of the service provider and may include, for example, name, address, contact information (e.g., phone number, e-mail address, etc.), financial account information, currently leased NFVs, and the like. The VNF inventory information 140 includes information associated with the VNFs 108 that may be available for lease to customers 114 of the service provider 122. The VNF pricing information 142 includes pricing information for each type of VNF 108 that is available for lease to customers. In one embodiment, the NFV pricing information 142 may include a pricing schedule that can be used by the application 104 to modify a price for each VNF 108 according to one or more parameters, such as date/time (e.g., a time of day, a time of the year, etc.), a capacity level of the NFV structure 110, occasional incentives provided to the customer 114, and the like. For example, the pricing schedule may provide a first price for a particular VNF 108 when the NFV structure 110 is experiencing under 50 percent capacity, a second price for that VNF 108 when the NFV structure 110 is experiencing between 50 to 80 percent capacity, and a third price for that VNF 108 when the NFV structure 110 is experiencing above 80 percent capacity. As another example, the pricing schedule may provide one price during a first quarter of the year, and another price during the other three quarters of the year.

Figure 2:
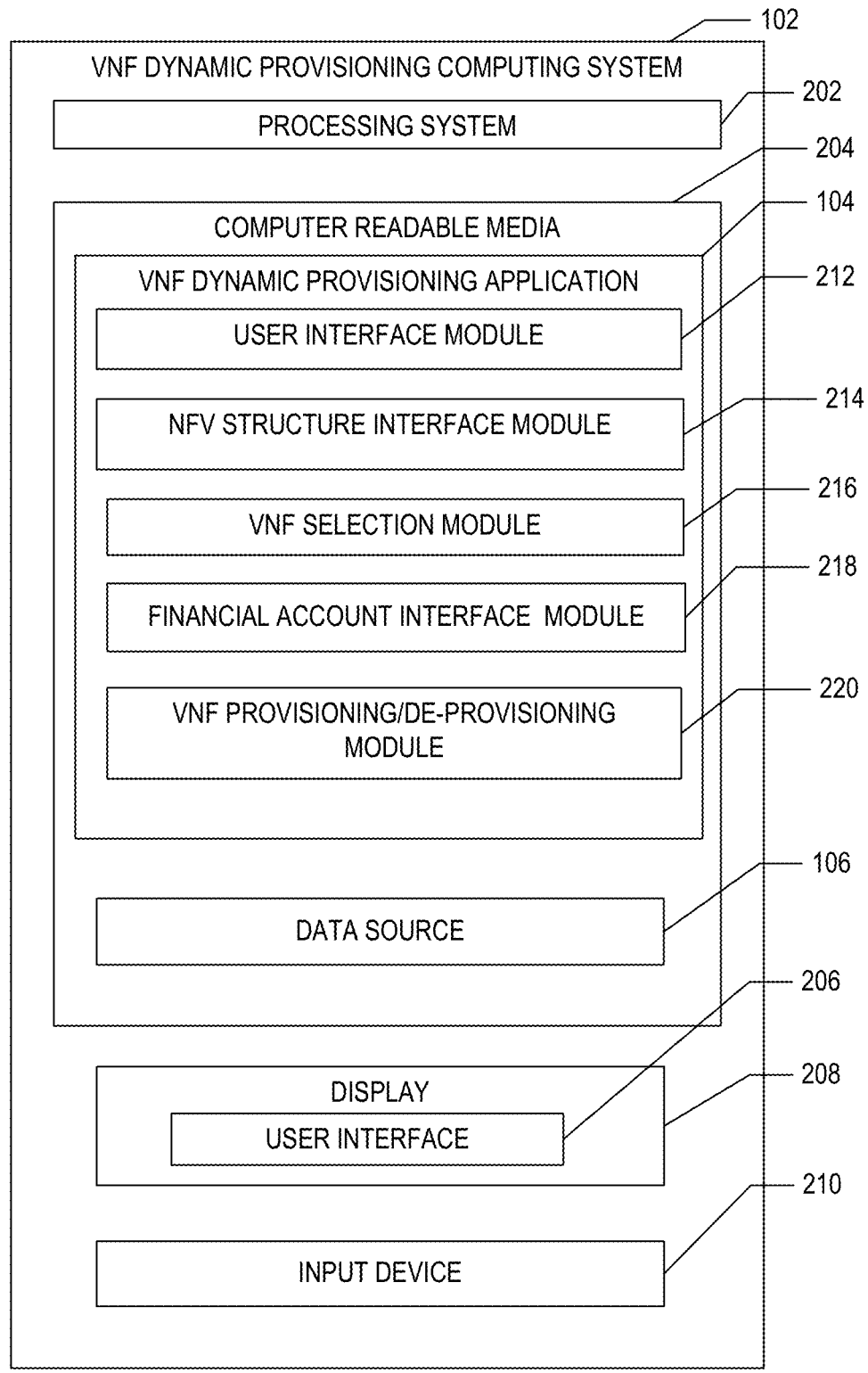
FIG. 2 is a block diagram depicting an example communication device leasing application executed on the communication device leasing computing system according to one embodiment of the present disclosure.

FIG. 2 is a block diagram depicting an example VNF dynamic provisioning application 104 executed on the communication device provisioning computing system 102 according to one embodiment of the present disclosure. The communication device provisioning computing system 102 includes a processing system 202 that includes one or more processors or other processing devices. A processor is hardware. Examples of such a computing system include one or more servers, personal computers, mobile computers and/or other mobile devices, and other computing devices. The communication device provisioning computing system 102 may communicate with the NFV structure 110 via wireless, wired, and/or optical communications.

According to one aspect, the communication device provisioning computing system 102 includes a computer readable media 204 on which the application 104 and data source 106 are stored. The application 104 includes instructions or modules that are executable by the processing system 202 to perform the features of the communication device dynamic provisioning system 100 described herein. The computer readable media 204 may include volatile media, nonvolatile media, removable media, non-removable media, and/or another available media that can be accessed by the Communication device provisioning computing system 102. By way of example and not limitation, computer readable media 204 comprises computer storage media and communication media. Computer storage media includes non-transient storage memory/media, volatile media, nonvolatile media, removable media, and/or non-removable media implemented in a method or technology for storage of information, such as computer/machine readable/executable instructions, data structures, program modules, and/or other data. Communication media may embody computer readable instructions, data structures, program modules, or other data and include an information delivery media or system.

According to one aspect, the computing system 102 includes a user interface 206 displayed on a display 208, such as a computer monitor, for displaying data. The computing system 102 may also include an input device 210, such as a keyboard or a pointing device (e.g., a mouse, trackball, pen, or touch screen) to enter data into or interact with the user interface 206. According to one aspect, the application 104 includes instructions or modules that are executable by the processing system 202 as will be described in detail herein below.

A user interface module 212 facilitates the receipt of input data and/or output data from or to the customer 114, respectively, for manipulating the operation of the system 100. In one example, the user interface module 212 may receive customer input for selecting one or more VNFs 108 to be leased, receiving provisioning information for provisioning those VNFs 108, and/or receiving financial account information for paying for those leased VNFs 108. In another example, the user interface module 212 may display information for the customer 114, such as the various types of VNFs 108 that are available for lease, and whether or not the transaction for the VNFs 108 was completed successfully.

A NFV structure interface module 214 communicates with the NFV structure 110 to control the operation of the VNFs 108. In one embodiment, the VNF structure interface module 214 may communicate with an orchestrator to control the operation of the VNFs 108. Generally speaking, an orchestrator is a system that controls the operation of hardware objects (e.g., hosts) and VNFs 108 executed on those hardware objects. One example of a suitable type of orchestrator 214 includes a Cisco Intelligent Automation For Cloud (CIAC) software suite available from Cisco Corporation in San Jose, Calif. In one embodiment, the application 104 may be implemented as a modular software component (e.g., a plug-in, an add-on, an extension, etc.) that may be deployed as a component of the orchestrator for manipulating the operation of the orchestrator to perform the various features of the present disclosure described herein. In another embodiment, the application 104 may be implemented independently of the orchestrator in which the orchestrator includes an application program interface (API) specifically designed to communicate with the NFV structure interface module 214 via the modular software component. In yet another embodiment, the NFV structure interface module 214 may communicate with the orchestrator using a suitable communication link (e.g., TCP/IP, RS232, etc.) that provides for control over certain operations of the orchestrator.

A VNF selection module 216 facilitates the selection of one or more VNFs 108 to be leased by the customer. For example, the NFV structure interface module 212 may generate a graphical user interface (GUI) or a command line interface (CLI) on the user interface 118 of the customer computing device 112 for prompting the customer to select one or more VNFs 108 to be leased, and receiving customer input in response to the prompt. In one embodiment, the VNF selection module 216 may access the VNF inventory information 140 and/or the VNF pricing information 142 stored in the data source 106 to generate the user interface 118 that is displayed for the customer 114. For example, the NFV structure interface module 216 may use the VNF inventory information 140 to display only those VNFs that are available for lease by the customer (e.g., those communication devices in the NFV structure 110 that have not been previously leased). Additionally, the NFV selection module 216 may use the communication device pricing information to associate a monetary price to be associated with each VNF 108 offered to the customer 114.

In one embodiment, one or more VNFs 108 may be provided according to a specified level of functionality, such as via a subscription service. For example, the VNF selection module 216 may provide router functionality on a throughput basis, such as one having 100 Giga-byte-per-second throughput. In this case, the VNF selection module 216 may obtain performance information about any available router VNFs 108 in the system, calculate a quantity of the router VNFs 108 that will be capable of providing router functionality at this level, and activate the router VNFs 108 for use by the customer.

A financial account interface module 218 communicates with a payment processing server, such as the customer financial account server 116 and/or the service provider financial account server 120, to transact a monetary transfer of funds from the customer's financial account to the financial account of the service provider via the service provider account server 120. For example, the application 104 may facilitate a financial transaction between a customer financial account of the customer 114 by communicating with the customer financial account server 116 to provide payment for the leased VNFs 108, and once payment is received, the application 104 may communicate with the service provider financial account server 120 to transfer the received payment to a service provider financial account of a service provider 122.

A VNF provisioning/de-provisioning module 220 manages the provisioning and/or de-provisioning of VNFs 108 that have been leased and those VNFs 108 whose leases have been expired, respectively. For example, the VNF provisioning/de-provisioning module 220 may receive instructions from the financial account interface module 218 to provision one or more VNFs 108 when a financial transaction for lease of those VNFs 108 have been successfully consummated by the financial account interface module 218. For example, the VNF provisioning/de-provisioning module 220 may communicate with a virtualized management system that manages the operation of the VNFs 108 to provision and de-provision the VNFs 108 according to information obtained from the VNF provisioning/de-provisioning module 220. Additionally, the VNF provisioning/de-provisioning module 220 may also monitor the customer account information 138 stored in the data source 106 to identify those VNFs 108 whose lease has expired and in response, de-provision those VNFs 108 from use.

It should be appreciated that the modules described herein are provided only as an example of a computing device that may execute the VNF dynamic provisioning application 104 according to the teachings of the present disclosure, and that other computing devices may have the same modules, different modules, additional modules, or fewer modules than those described herein. For example, one or more modules as described in FIG. 2 may be combined into a single module, or one module described above may be embodied as two or more separate modules. As another example, certain modules described herein may be encoded and executed on other computing devices that are separate and distinct from the computing device 102 as described above.

Figure 3A:
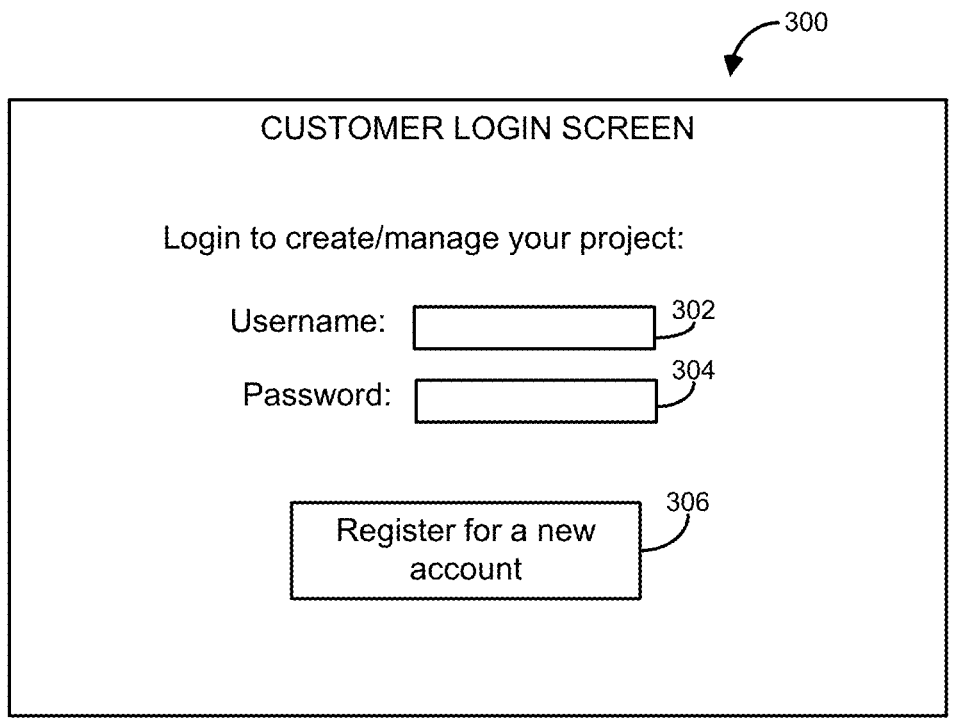
Figure 3B:
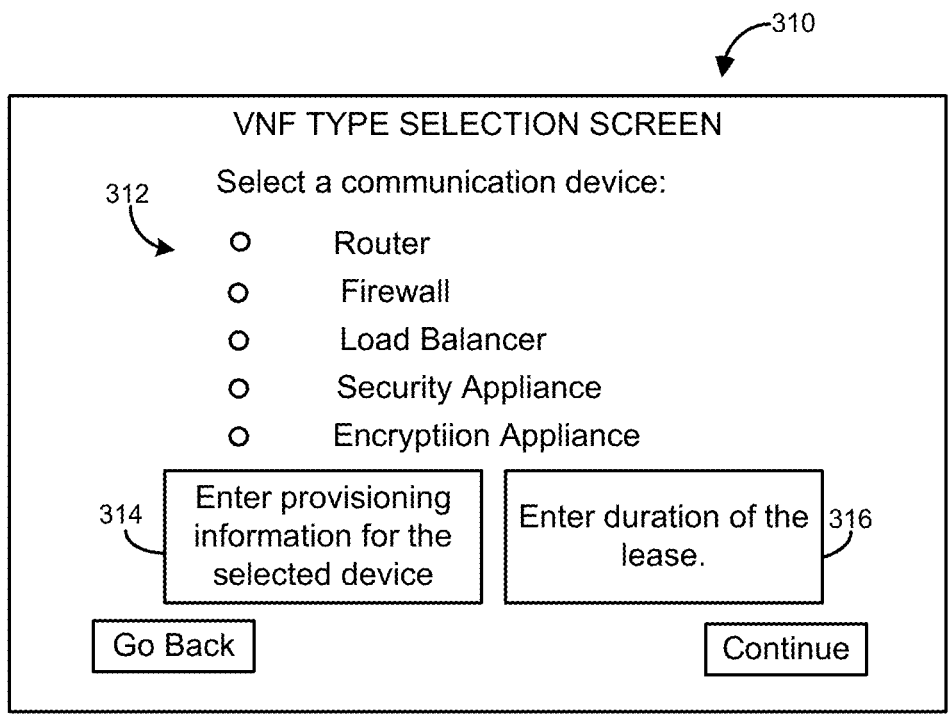

FIGS. 3A through 3D illustrate example screenshots that may be displayed by the network function provisioning application 104 for leasing VNFs 108 on the user interface 118 of a customer computing device 112 according to one embodiment of the present disclosure. In general, FIG. 3A is a customer login screen 300, FIG. 3B illustrates a VNF type selection screen 310, FIG. 3C illustrates a VNF selection screen 330, and FIG. 3D illustrates a transaction consummation screen 350.

Referring initially to FIG. 3A, a customer login screen 300 is provided that that is used to receive passcode information from the customer 114 for establishing a login session with the customer 114. The customer login screen 300 includes a username field 302 and a password field 304 for entry of a username and password, respectively, for an account associated with a customer 114. The login session provides for authentication of the customer 114 to mitigate the possibility of any illicit transactions that may be incurred by the application 104. Although a username/password combination is described herein for establishing a login session, it should be understood that the customer login screen may use any suitable authentication mechanism. For example, the customer login screen 300 may communicate with the customer computing device 112 to receive biometric scan data, such as fingerprint data obtained from a fingerprint scan device to authenticate the user for establishing the login session. The customer login screen 300 may also include a registration button 306 that when selected, causes the VNF dynamic provisioning application 104 to generate one or more other screens for registering an account with the customer 114.

Once the customer 114 has been authenticated, the VNF type selection screen 310 (FIG. 3B) may be displayed that provides for user selection of a type of VNF 108 by the customer 114. The VNF type selection screen 310 may include a VNF types list 312 including a selectable list of VNF types that may be selected by the customer 114, a provisioning entry button 314, and a lease duration entry button 316. The VNF type list 312 includes one or more indications of various VNF types that may be selected by the customer 114. The provisioning entry button 314 is provided so that, after selection of a particular VNF type is entered by the customer 114, additional provisioning information related to that selected VNF may be entered by the customer 114.

The leasing duration entry button 316 is provided to receive user information associated with a starting time and duration that the selected VNF is to be leased by the customer 114. The leasing duration entry button 316 provide a mechanism for the application 104 to receive timing information related to a period of time in which the VNF is to be leased. For example, the application may receive a start time (e.g., the current date/time, a particular date and/or time in the future, etc.) indicating when the lease is to begin, and a duration (e.g., one month, 20 days, 2 years, etc.) representing how long the lease is going to occur.

When a particular VNF type has been selected by the customer 114, the application 104 may display the VNF selection screen 330 (FIG. 3C) may be displayed that provides for user selection of a particular VNF by the customer 114. The VNF selection screen 330 generally includes a list of VNFs arranged in a table 332 in which the rows represent VNFs 108 in the NFV structure 110, while the columns 334 represent various parameters of each VNF. As shown, certain rows have been greyed-out to indicate that their respective VNFs are not available for lease due to some reason. Examples in which certain VNFs may not be available for lease may include all otherwise available VNFs of a particular type are currently being leased, none of any available VNFs of a particular type are in a working, functional state, and/or the VNFs are not compatible with the customer's native equipment. Nevertheless, other embodiments contemplate that any suitable visual cue (e.g., change in color, hue, etc.) or other suitable indicia may be provided to delineate those VNFs that are available for lease from other VNFs that are not currently available for lease.

The table 332 includes a model column 334a, a location column 334b, a performance rating column 334c, a pricing column 334d, and a selection column 334e. The model column 334a indicates a make and model information associated with its respective VNF. The location column 334b indicates a geographical region or other location moniker indicating a location of the VNF. The performance rating column 334c displays one or more performance ratings that are associated with its respective VNF. Although only a throughput (e.g., bandwidth) rating is shown, it should be understood that the performance ratings column 334c may include and number of type of performance ratings (e.g., memory allocation, processing speed, etc.) to be associated with its respective VNF. The pricing column 334d displays a cost to be assessed to the customer 114 for leasing its respective VNF.

The selection column 334e provides for selection of a particular VNF by the customer 114. For example, as shown, the VNF having a model identification of "ACME 1102a" has been selected by the customer 114. Thus, when the 'continue' button is actuated by the customer 114, the transaction consummation screen 350 (FIG. 3D) may be displayed that facilitates consummation of a transaction for leasing the selected VNFs for use by the customer 114.

The VNF consummation screen 350 (FIG. 3D) includes a list of VNFs 352 selected for lease by the customer 114, a 'continue shopping' button 354, and a 'proceed to checkout' button 356. Once the customer 114 has selected all desired VNFs for lease, the 'proceed to checkout' button 356 may be actuated to perform a financial transaction for paying for the leased VNFs. However, if the customer wishes to add additional VNFs to the list of VNFs, the 'continue shopping' button 354 may be actuated such that the VNF type selection screen 330 (FIG. 3B) may again be displayed on the customer computing device 112 to receive selection of another VNF to be added to the list of VNFs 352. Thus, the list of VNFs 352 is cumulative in that additional VNFs may be added by the customer 114 and a transaction consummated after all desired VNFs have been selected for lease.

Although FIGS. 3A through 3D illustrate example entry screens that may be used for leasing VNFs to the customer 114 or other user, the system 100 may include additional, fewer, or different entry screens without departing from the spirit and scope of the present disclosure. For example, the system may include one or more other screens for facilitating display of information to the customer, and/or received user input from the customer for leasing VNFs.

Figure 4:
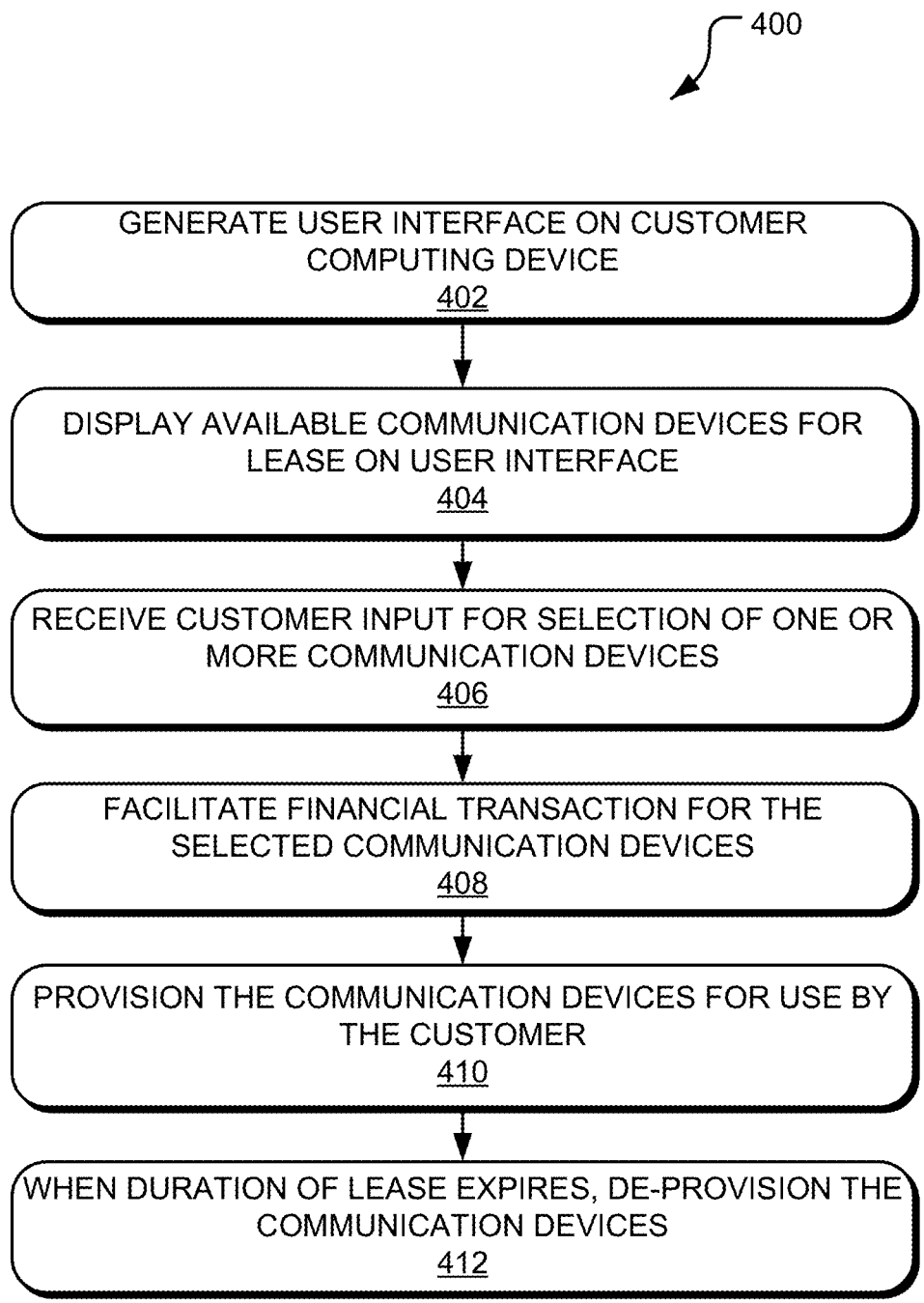
FIG. 4 illustrates an example process that may be performed by the VNF leasing application according to the teachings of the present disclosure.

FIG. 4 illustrates an example process 400 that may be performed by the VNF dynamic provisioning application 104 according to the teachings of the present disclosure. Initially in step 402, the application 104 generates a user interface 118 on the customer computing device 112. In one embodiment, the application 104 may generate a user interface in the form of a webpage that is transmitted to the customer computing device 112 using a communication network, such as the Internet. In another embodiment, the application 104 may establish a login session with the customer 114 by receiving passcode information and comparing that passcode information with that stored as user account information 138 in the data source 106 to ensure no illicit access is obtained to the application 104. Nevertheless, use of a login session may be omitted if providing a secure channel for communication with the customer 114 is not needed or desired (e.g., the customer computing device 112 is implemented in a secure environment such that no secure communication channel is needed).

In step 404, the application 104 displays available VNF devices on the user interface 118. For example, the application 104 may display VNF type selection screen (FIG. 3B) to receive selection of a particular type of VNF to be leased and a VNF selection screen (FIG. 3C) to receive selection of a particular VNF from the customer 114. In one embodiment, the application 104 may also display other information associated with each VNF such as, make (e.g., brand) and model of the VNF, geographical location of the VNFs, one or more performance ratings associated with the VNFs, and a cost to lease each VNF. In one embodiment, the application 104 may calculate a cost for certain VNFs according to pricing information 142 stored in the data source 106. For example, the application 104 may access the pricing information 142 to determine that a particular VNF is on sale at 50 percent of its normal price during the month of July. Specific pricing information set out herein is provided solely for the sake of example. Since the normal price of the VNF as included in the VNF inventory information 140 is set to be $8.00 per month, the application 104 may calculate a price for that VNF to be $4.00 per month and display that amount on the user interface 118 for view by the customer 114.

In step 406, the application 104 may receive customer input that includes selection of one or more VNFs. In one embodiment, the application 104 may also receive provisioning information to be included with each selected VNF. For example, the application 104 may receive provisioning information to be included with a router, such as routing table information, or if the VNF is a firewall, receive firewall rule information to be included as firewall rules for use by the firewall.

In step 408, the application 104 facilitates a financial transaction for leasing the VNFs to the customer 114. For example, the application may display the transaction consummation screen (FIG. 4D) on the user interface 118 that displays the currently selected VNFs to be leased by the customer 114 along with pricing information for each VNF. When the customer 114 is satisfied with the currently selected VNFs, the application 104 may facilitate the transaction by communicating with a customer financial account server 116 of the customer to withdraw monetary funds for transfer to a service provider financial account server 120 of the service provider to pay for the VNFs that are to be leased. Nevertheless, it is contemplated that other embodiments of the VNF dynamic provisioning system 100 may provide VNFs 108 for use by the customer without monetary transferal from the customer to the provider.

In step 410, the application 104 provisions the selected VNFs for the customer. The application 104 may provision the selected VNFs using information provided by the customer via the user interface 118. In one embodiment, the application 104 communicates with an orchestrator that manages the operation of the VNFs to provision those VNFs. Nevertheless, the application 104 may provision the leased VNFs using any suitable mechanism or technique.

In step 412, the application 104 continually monitors the operation of the VNFs according to the consummated transaction stored as user account information 138 in the data source 106. For example, the application 104 may scan through the user account information 138 on a periodic basis (e.g., every day) to find any VNFs whose lease has expired. When the application 104 determines that a lease to a particular VNF has expired, it may then de-provision that VNF, and update the VNF inventory information 140 in the data source 106 such that it may be available for lease by other customers of the VNF dynamic provisioning system 100.

The process may be continued at as described above for leasing other VNFs to other customers or the same customer. Nevertheless, when use of the application 104 is no longer needed or desired, the process ends.

It should be appreciated that the process described herein is provided only as an example and that the VNF dynamic provisioning system 100 may execute additional steps, fewer steps, or differing steps than those described herein. For example, the steps 402 through 412 may be executed in any suitable order; that is, the steps as described in FIG. 4 are not limited to execution in any particular sequence. As another example, either of the steps 402 through 412 described herein may be executed by the upgrade computing system 102 or may alternatively be performed by another computing system without departing from the spirit or scope of the present disclosure.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 5:
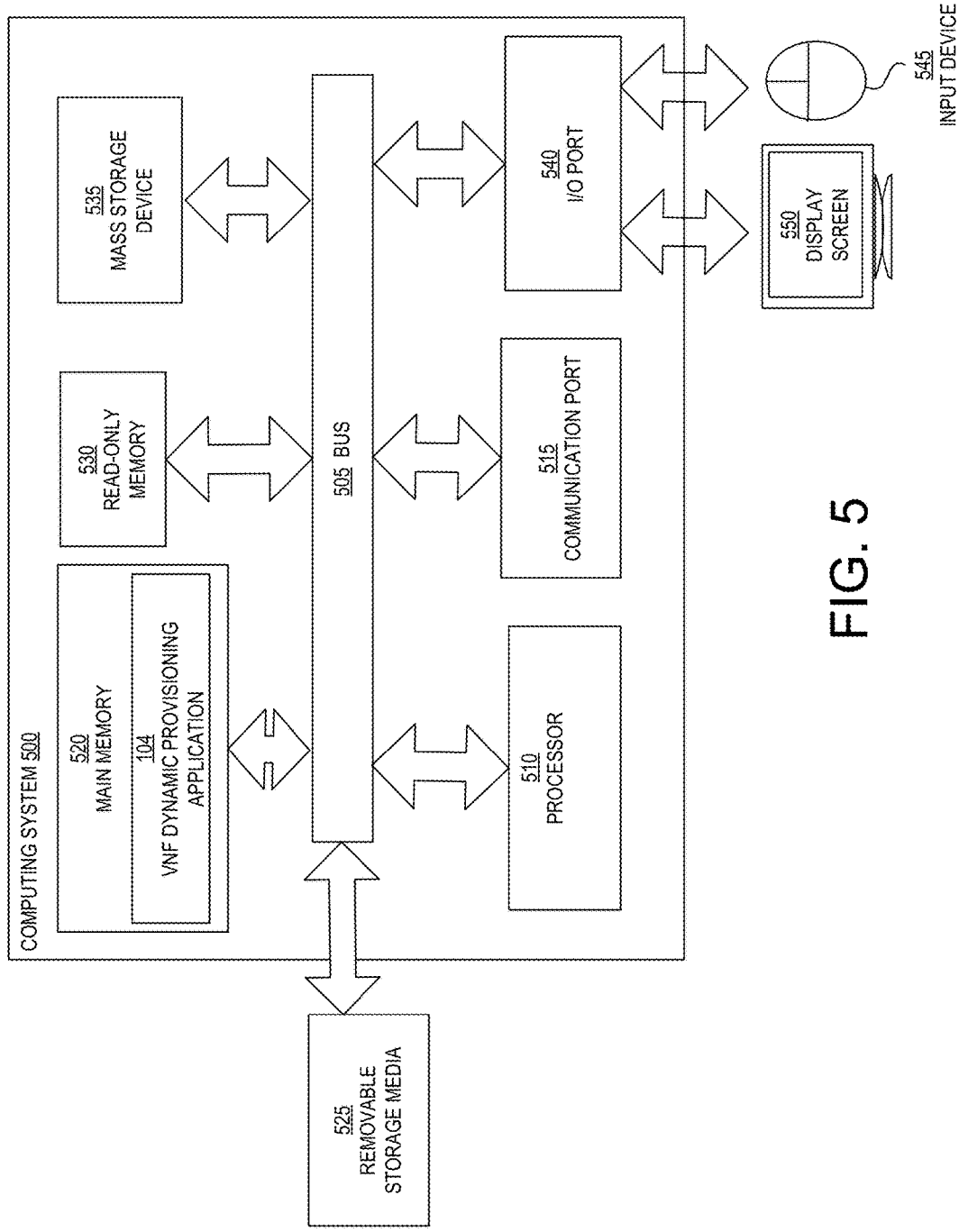
FIG. 5 illustrates an example computer system according to one embodiment of the present disclosure.

For example, FIG. 5 is a block diagram illustrating an example of a host or computer system 500 which may be used in implementing the embodiments of the present disclosure. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A dynamic provisioning system comprising:
   a computing system comprising a processing system and a memory for storing instructions that are executed by the processing system to:
   generate a user interface for receiving selection of a virtualized communication device;
   facilitate a financial transaction for leasing the virtualized communication device;
   communicate with an orchestrator executed to manage operation of hardware objects and the virtualized communication device executing on the hardware objects, the orchestrator including an application program interface (API) configured to communicate with a provisioning application;
   provision the virtualized communication device to prepare and equip the virtualized communication device to be used according to the financial transaction;
   receive start time information and duration information associated with the selected virtualized communication device;
   provision the virtualized communication device at a start time identified by the received start time information and;
   de-provision the virtualized communication device at an ending time associated with the received duration information.

2. The dynamic provisioning system of claim 1, wherein the virtualized communication device comprises a virtualized network function (VNF) configured in a network function virtualization (NFV) structure, the VNF is executed by a physical host to emulate an operation provided by a physical communication device.

3. The dynamic provisioning system of claim 1, wherein the instructions are further executed to facilitate the financial transaction by communicating with a financial account of a customer as payment for leasing the virtualized communication device.

4. The dynamic provisioning system of claim 1, wherein the instructions are further executed to:
   display virtualized communication device information associated with the virtualized communication device on the user interface; and
   display monetary price information to be associated with the virtualized communication device on the user interface.

5. The dynamic provisioning system of claim 4, wherein the instructions are further executed to calculate the monetary price information according to a pricing schedule stored in the memory.

6. The dynamic provisioning system of claim 1, wherein the instructions are further executed to:
   display virtualized communication device information associated with the virtualized communication device on the user interface; and
   display an indication of availability of the virtualized communication device on the user interface.

7. A dynamic provisioning method comprising:
   generating, using instructions stored on a computer-readable medium and executed by a processor, a user interface for receiving selection of a virtualized communication device;
   facilitating, using the instructions, a financial transaction for leasing the virtualized communication device;
   provisioning the virtualized communication device by communicating with an orchestrator to provision the selected virtualized communication device, the orchestrator executed to manage the operation of hardware objects and the virtualized communication device executing on the hardware objects, the orchestrator including an application program interface (API) configured to communicate with a provisioning application;

receiving start time information and duration information associated with the selected virtualized communication device from the user interface;

provisioning, using the instructions, the virtualized communication device at a start time identified by the received start time information to prepare and equip the virtualized communication device to be used according to the financial transaction;

de-provisioning each of the virtualized communication device at an ending time associated with the received duration information.

8. The dynamic provisioning method of claim 7, wherein the virtualized communication devices comprise virtualized a network functions (VNF) configured in a network function virtualization (NFV) structure, the VNF is executed by a physical host to emulate an operation provided by a physical communication device.

9. The dynamic provisioning method of claim 7, further comprising facilitating the financial transaction by communicating with a financial account of a customer as payment for leasing the virtualized communication device.

10. The dynamic provisioning method of claim 7, further comprising:

displaying virtualized communication device information associated with the virtualized communication device on the user interface; and displaying a monetary price to be associated with each of the virtualized communication device on the user interface.

11. The dynamic provisioning method of claim 10, further comprising calculating the price according to a pricing schedule stored in memory.

12. The virtualized communication device dynamic provisioning method of claim 7, further comprising:

displaying virtualized communication device information associated with the virtualized communication devices on the user interface; and displaying an indication of availability of each virtualized communication device on the user interface.

13. A non-transitory computer-readable medium encoded with instructions executable by a processor to:

generate a user interface for receiving selection of a virtualized communication device;

facilitate a financial transaction for leasing the virtualized communication device;

communicate with an orchestrator executed to manage operation of hardware objects and the virtualized communication device executing on the hardware objects, the orchestrator including an application program interface (API) configured to communicate with a provisioning application;

provision the virtualized communication device to prepare and equip the virtualized communication device to be used according to the financial transaction;

receive a start time and a duration time associated with the selected virtualized communication device from the user interface;

provision each of the virtualized communication device at the received start time; and de-provision each of the virtualized communication device at a conclusion of the received duration time.

14. The instructions of claim 13, wherein the virtualized communication device comprise a virtualized network function (VNF) configured in a network function virtualization (NFV) structure, the VNF is executed by a physical host to emulate an operation provided by a physical communication device.

15. The instructions of claim 13, further executed to facilitate the financial transaction by communicating with a financial account of a customer as payment for leasing the virtualized communication device.

16. The instructions of claim 13, further executed to:
display the virtualized communication device on the user interface;
calculate a monetary price according to a pricing schedule stored in memory: and display the monetary price to be associated with each of the virtualized communication device on the user interface.

17. The instructions of claim 13, further executed to:
display virtualized communication device information associated with the virtualized communication device on the user interface; and
display an indication of availability of the virtualized communication device on the user interface.

* * * * *